Aug. 20, 1935.   L. F. NENNINGER ET AL   2,012,081
MILLING MACHINE
Filed Sept. 28, 1929   10 Sheets—Sheet 1
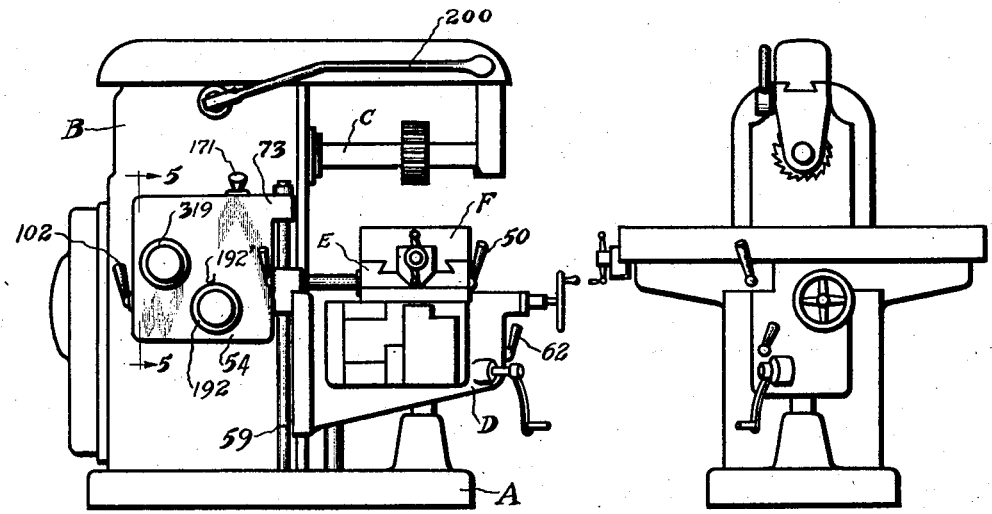
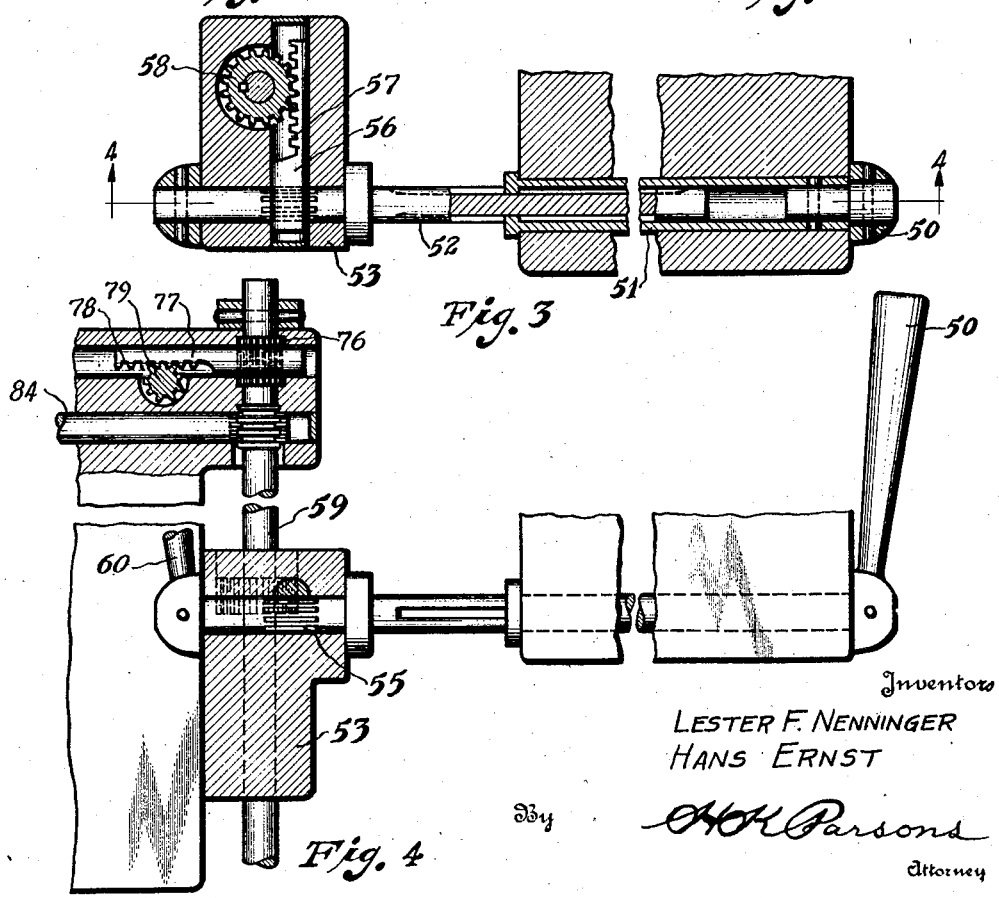
Inventors
LESTER F. NENNINGER
HANS ERNST
By A. H. Parsons
Attorney

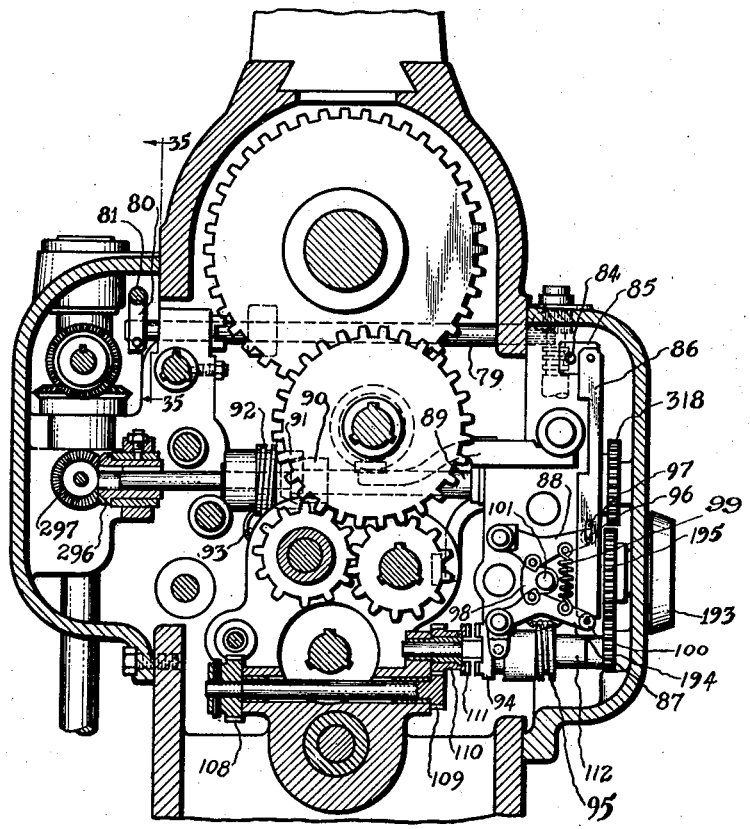

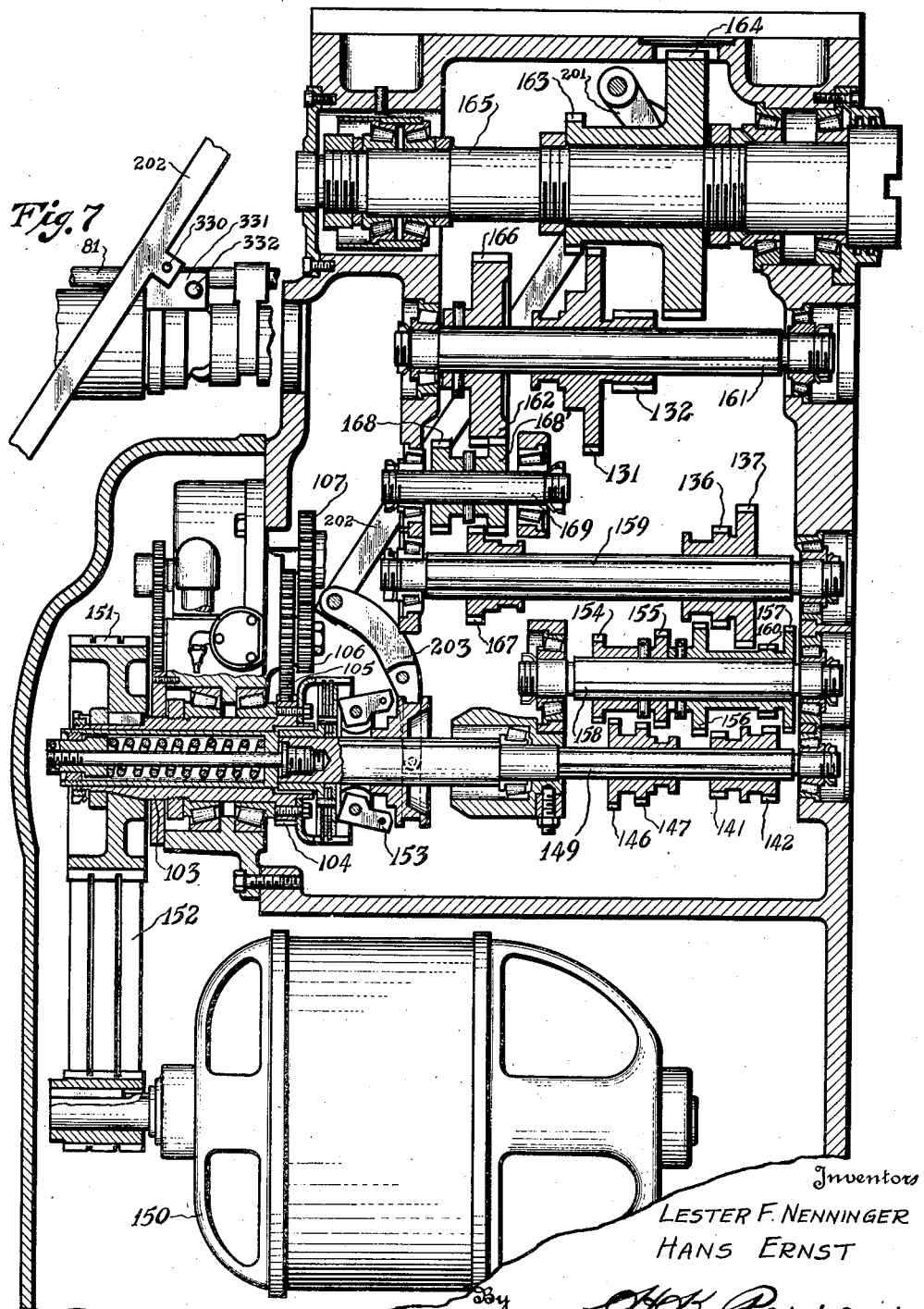

Aug. 20, 1935.   L. F. NENNINGER ET AL   2,012,081
MILLING MACHINE
Filed Sept. 28, 1929   10 Sheets-Sheet 4
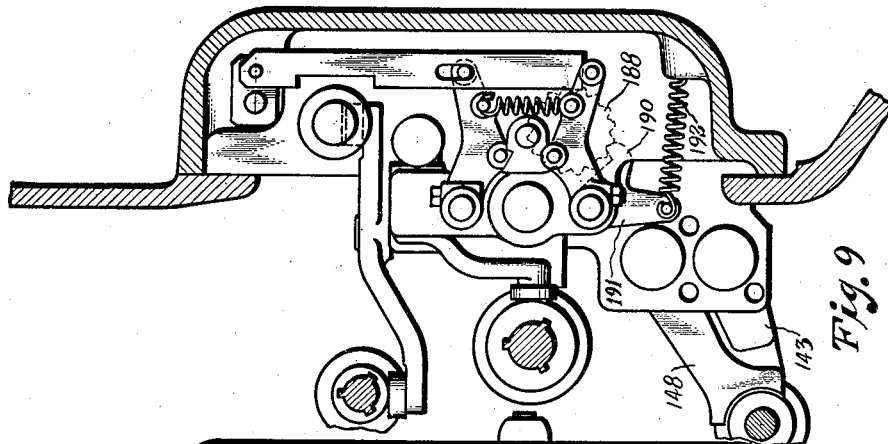
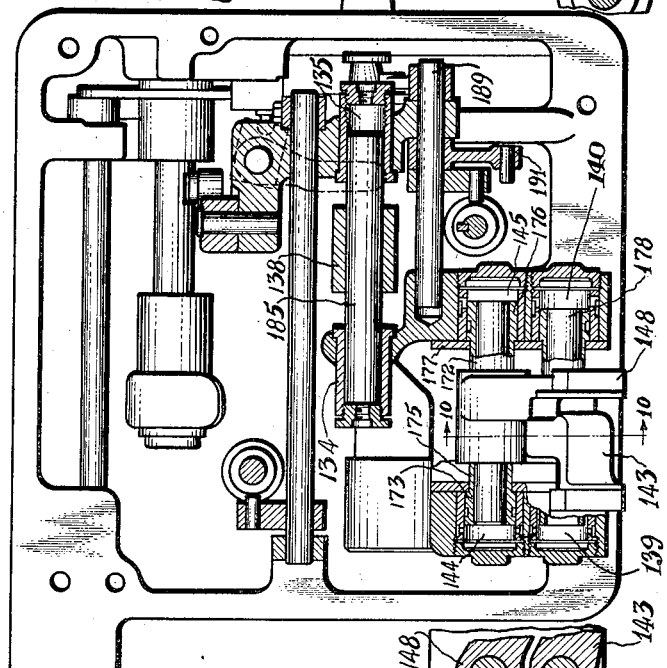
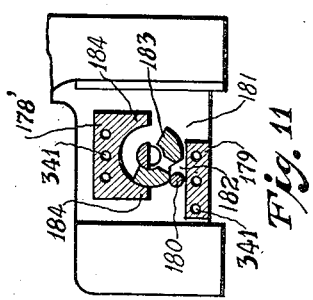
Inventors
LESTER F. NENNINGER
HANS ERNST
By   HK Parsons
Attorney

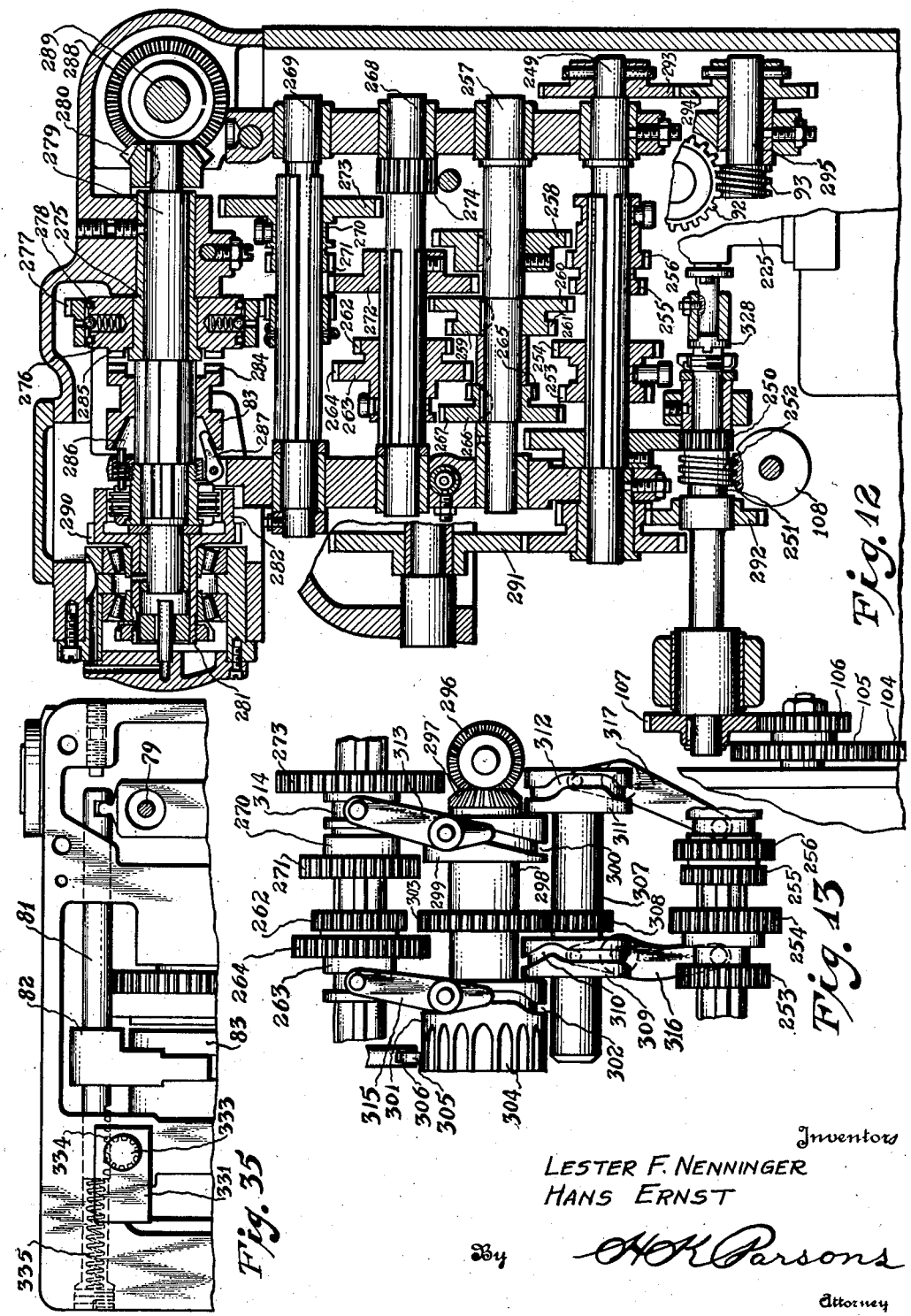

Aug. 20, 1935.  L. F. NENNINGER ET AL  2,012,081
MILLING MACHINE
Filed Sept. 28, 1929  10 Sheets-Sheet 6
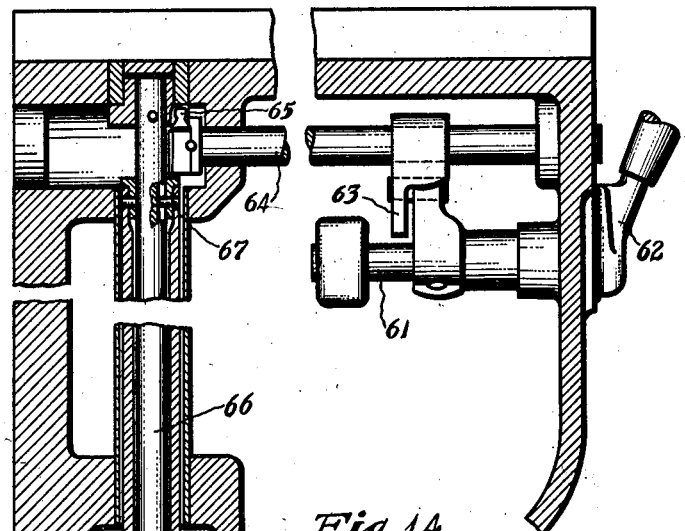
Fig. 14
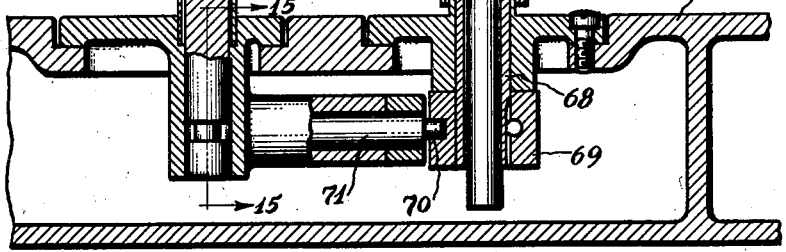
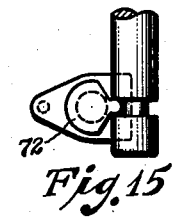
Fig. 15
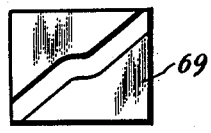
Fig. 26
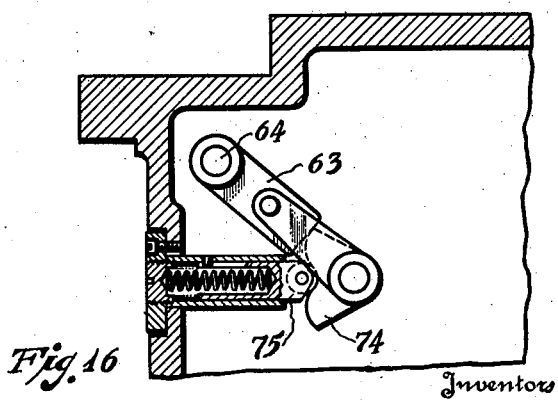
Fig. 16
Inventors
LESTER F. NENNINGER
HANS ERNST
By  A. H. Parsons
Attorney

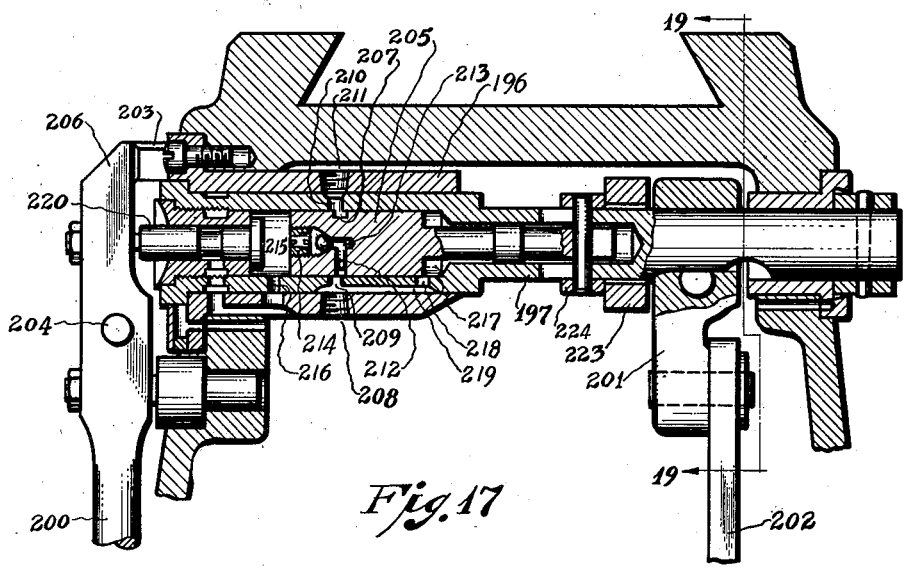
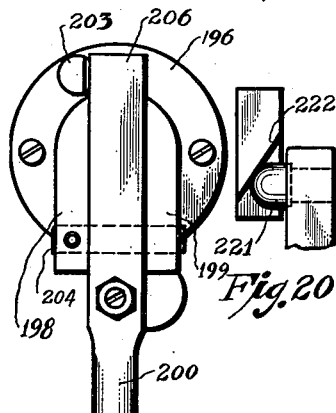
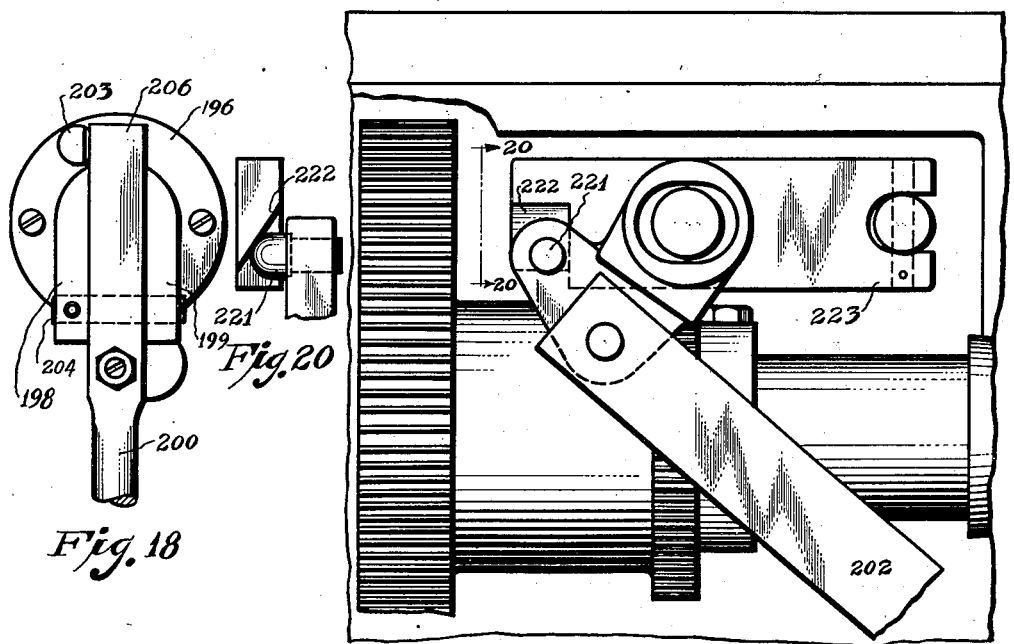

Aug. 20, 1935.  L. F. NENNINGER ET AL  2,012,081
MILLING MACHINE
Filed Sept. 28, 1929  10 Sheets-Sheet 8

Inventors
LESTER F. NENNINGER
HANS ERNST
By A. H. Parsons
Attorney

Aug. 20, 1935.  L. F. NENNINGER ET AL  2,012,081
MILLING MACHINE
Filed Sept. 28, 1929  10 Sheets-Sheet 9
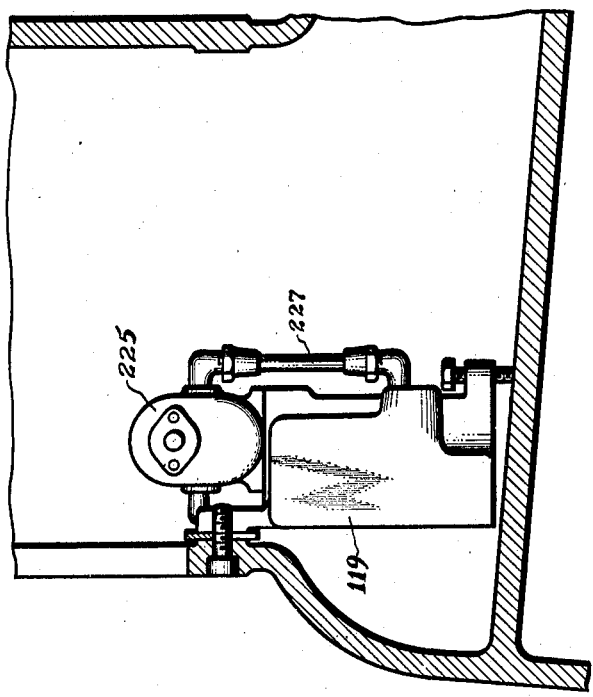
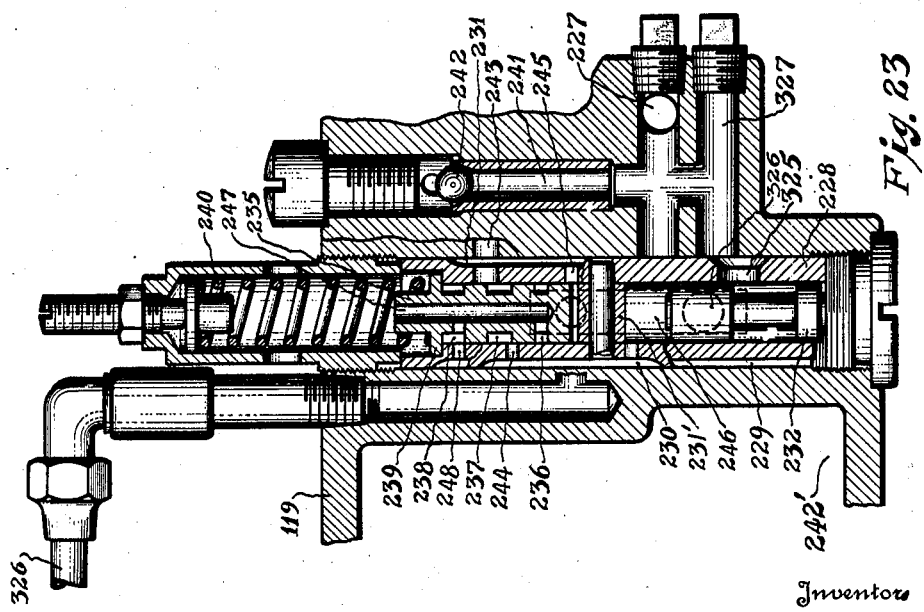
Inventors
LESTER F. NENNINGER
HANS ERNST
By A. H. K. Parsons
Attorney

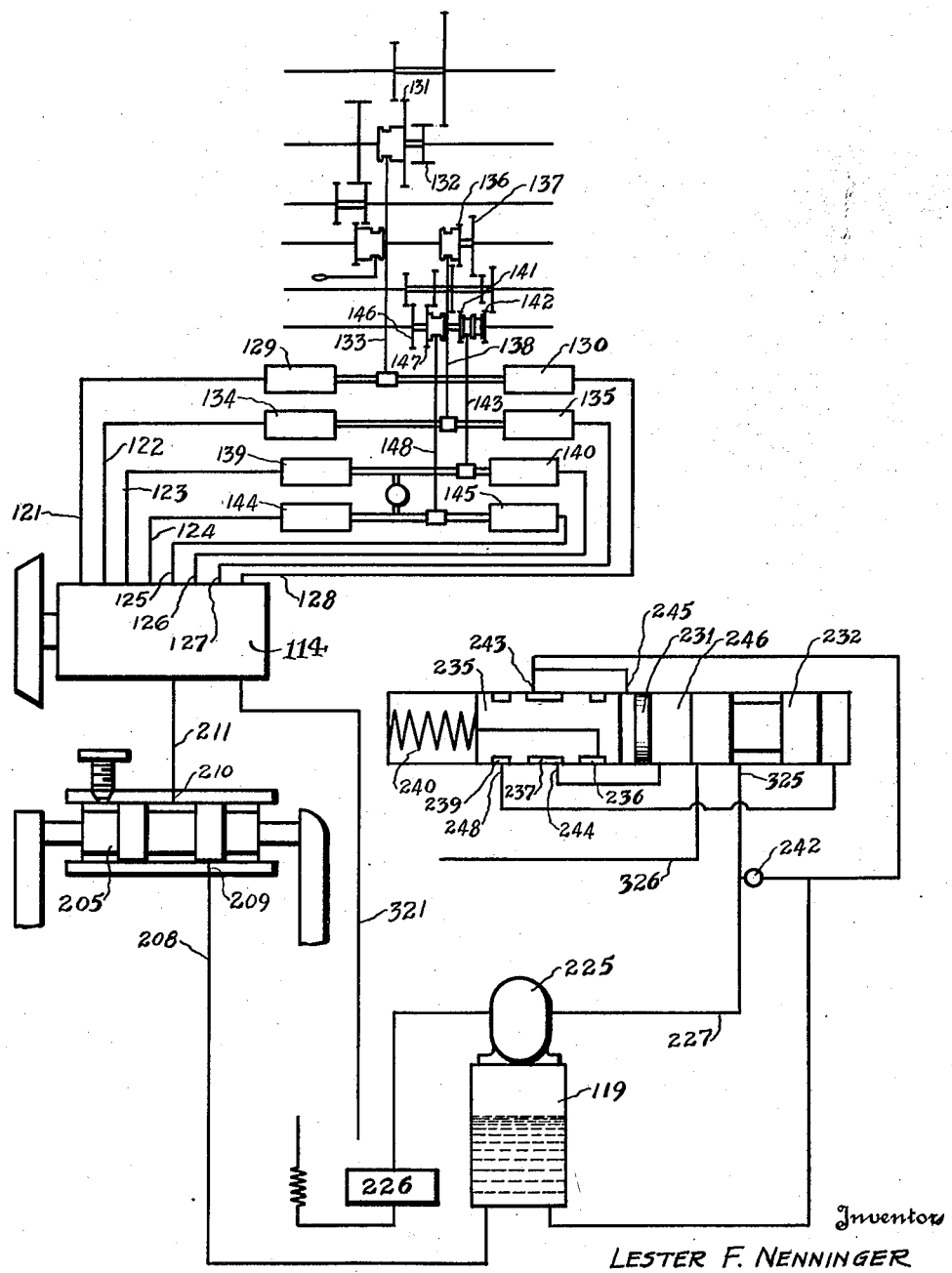

Patented Aug. 20, 1935

2,012,081

UNITED STATES PATENT OFFICE 2,012,081

MILLING MACHINE

Lester F. Nenninger and Hans Ernst, Cincinnati, Ohio, assignors to The Cincinnati Milling Machine Company, Cincinnati, Ohio, a corporation of Ohio Application September 28, 1929, Serial No. 395,929

51 Claims. (Cl. 90—21)

This invention relates to improvements in machine tools and has particular reference to the actuating mechanism therefor.

One of the principal objects of the present invention is the provision of an improved control mechanism for milling machines or other machine tools which will greatly facilitate and minimize the time required for effecting adjustment of the various parts thereof.

A further object of the invention is the provision of improved power actuable mechanism for most rapidly and selectively determining the rate of actuation of a given part of the tool.

Another object of the invention is the provision of a rate adjusting mechanism capable of power actuation to expedite the movement thereof, in which the mechanism may be set for a desired rate and later actuated to effect that rate, thus allowing the operator opportunity to anticipate rate change requirements, which may be immediately effected at the required time with a minimum of attention.

An additional object of the invention is the provision of an improved hydraulically actuated rate changing mechanism for machine tool transmissions.

Other objects of the invention include an improved mechanism for effecting spindle rotation rates and translatory movement rates through a combination of mechanically and hydraulically actuated control mechanism which will greatly facilitate attainment of the ultimate desired results by the operator.

Other objects and advantages of the present invention should be readily apparent by reference to the following specification, considered in conjunction with the accompanying drawings illustrative of one embodiment thereof, but it will be understood that we may make any modifications in the specific structural details hereinafter disclosed, within the scope of the appended claims, without departing from or exceeding the spirit of the invention.

Referring to the drawings, in which like reference numerals indicate like parts:

Figure 1 is a side elevation of a milling machine embodying the present improvement.

Figure 2 is a front view thereof.

Figure 3 is a fragmentary horizontal section illustrating the front and rear quick traverse control mechanism.

Figure 4 is a view partially in elevation and partially in section as on line 4—4 of Figure 3.

Figure 5 is a transverse section through the machine as on line 5—5 of Figure 1, showing the general clutch control mechanism.

Figure 6 is a developed sectional view through the spindle drive gearing.

Figure 7 is a fragmentary view of the knockout mechanism.

Figure 8 is a partially sectional elevation of the spindle speed control mechanism.

Figure 9 is a end view thereof.

Figure 10 is a sectional view on line 10—10 of Figure 8.

Figure 11 is a sectional view on line 11 of Figure 10, showing details of the piston interlock.

Figure 12 is a sectional development of the variable feed drive transmission to the translatable parts of the machine tool, such as saddle, table and knee.

Figure 13 is a developed view showing the control cams for the variable feed transmission.

Figure 14 is a detailed vertical section of the rate changer control train from the front of the machine.

Figure 15 is a detail view as on line 15—15 of Figure 14.

Figure 16 is a detail of the automatic neutralizer.

Figure 17 is a sectional developed view of the starting control valve.

Figure 18 is an end view of the left end of Figure 17.

Figure 19 is a view as on line 19—19 of Figure 17.

Figure 20 is an end detail view as on line 20—20 of Figure 19.

Figure 23 is a sectional view through the accumulator valve.

Figure 24 is a view showing the mounting of the pump and accumulator.

Figure 25 is a diagrammatic view of the piping of the hydraulic speed gear shift control system.

Figure 26 is a developed view of the control cam shown in Figure 14.

Figure 22:
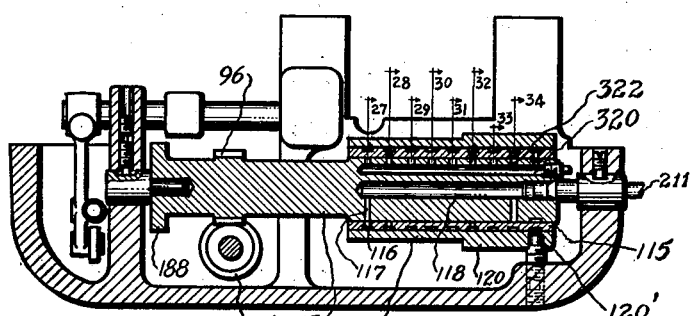
Figure 22 is a sectional view of the selector valve.
Figure 27:
Figure 34:
Figure 28:
Figure 33:
Figure 29:
Figure 32:
Figure 30:
Figure 31:

Figures 27 to 34, inclusive, are sectional views on lines 27 to 34 respectively of Figure 22.

Figure 35 is a sectional elevation on line 35—35 of Figure 5.

Figure 36 is a perspective view of the automatic feed drive knockout mechanism.

In the drawings, the principles of the present invention have been shown in a specific embodiment as applied to a milling machine, including a bed A having a column B within which is journaled a spindle C. The column is provided with ways on which a knee D is vertically movable and in turn supports a saddle E for in and out movement or translation on the knee. A second translatable unit or table F is mounted on the saddle, suitable power drive being preferably coupled with the knee, saddle and table to effect desired translatory movements thereof, so that the distance between the table and spindle may be varied and, in addition, the work supporting portion of the table may be given translatory movements both parallel with and transversely of the axis of the cutter spindle C.

Referring to Figures 3 and 4, the numeral 50 designates a control handle—in this case intended to determine quick traverse movement of a selected part. The handle is carried by a sleeve 51 mounted in the saddle, within which telescopes shaft 52 extending rearwardly from the saddle through a bearing block 53 supported by the knee D adjacent the speed box unit 54, illustrated as disposed upon the column. Shaft 52 has a pinion 55 meshing with a rack portion on plunger 56 which has an additional rack portion 57 meshing with gear 58 which is slidably mounted on the splined shaft 59. The arrangement is such that a rotation of the sleeve 51 by the handle 50 imparts a rotation to the shaft 59, which movement is not interfered with by the in and out movement of the saddle or the up and down movement of the knee. It is also important to note that the shaft 52 extends through the bearing block 53 and is provided with a handle 60, thus making it possible to oscillate the shaft 59 and thus control the quick traverse movement from the operator's normal position at the front of the machine or from a position alongside of the column in case it is necessary to operate the machine from that point.

The shaft 59 also has a reciprocatory movement to control the power gear shifting mechanism, which will be described later, and this is accomplished through mechanism which will now be described.

Journaled in the knee is a spindle 61, Figure 14, actuable by a handle 62 and coupled through linkage 63 with shaft 64 having a rock lug 65 for oscillation of splined shaft 66 which, through the key 67, imparts oscillation to the sleeve 68 rotatably mounted in the base A of the machine. The sleeve 68 carries at its lower end a cam 69, shown in developed view in Figure 26, which is coupled by pin 70 to shaft 71 for oscillation thereof. A rock lug 72, Figure 15, is provided on the end of shaft 71 for reciprocating the shaft 59 which is rotatably and slidably mounted at its upper end in the lug 73 of the speed box. It is thus seen that the shaft 59 may be given a reciprocating movement by the handle 62, irrespective of the up and down movements of the knee. The linkage 63, as shown in Figure 16, is provided with a neutralizer consisting of a cam member 74 and a spring pressed roller 75, the construction being such that the handle 62 must be held by manual pressure to drive the gear shifting mechanism for the feed transmission or the selector control valve of the spindle speed transmission.

The rotational movement of the shaft 59 acts through the pinion 76 to oscillate plunger 77 having rack teeth 78 thereby rotating shaft 79. The shaft 79 is provided with a rock lug 80 which imparts reciprocatory movement to the clutch control shaft 81 which has mounted thereon shifter 82 for moving the clutch member 83 into connection with the feed or rapid traverse. The reciprocatory movement of shaft 59 rotates the shaft 84 which has a rock lug 85 for moving the control member 86 which member has lost motion connections with bell cranks 87 and 88 for controlling the application of power to the gear shifting mechanism. It is thus apparent that the shaft 59 may be oscillated through the handle 50 to control the application of the rapid traverse movement to the moving part and that it may also be reciprocated by the handle 62 to control the application of power to the gear shifting mechanism. When arm 86 is raised from the neutral position as shown in Figure 5, it shifts bell crank 88 moving shaft 89 toward the left. This couples clutch member 90 on shaft 89 with the driving clutch member 91 having worm gear 92 meshing with the driven worm 93 on the hereinafter described feed transmission whereby power is supplied for automatically shifting the feed rate control cam.

When member 86 is lowered from the neutral position shown in Figure 5 it shifts the bell crank 87 thereby moving clutch member 94 to the left as shown in Figure 5 to thereby drive the worm 95 which through the worm 96 rotates the selector control valve which thereby controls the spindle speed rate by means of fluid pressure.

It will be noted that the connection between bell crank 88 and member 86 is that of a pin 96 engaged in a slot 97 in the member, as a result of which downward movement of the lever 86 will not effect bell crank 88 which is held in engagement with the cam 98 by the spring 99. This same downward movement however, of the lever 86 acts through the roller 100 to move the bell crank 87 against the tension of the spring 99. Since the roller 100 merely engages the free end of the lever 86, upward movement of the lever will not effect the bell crank 87 which will be held in neutral position against the cam 98 by the tension of the spring 99.

The cam 98 is mounted on the end of a shaft 101 which extends through the speed box 54 and is provided with a handle 102, as shown in Figure 1. The handle 102 thus forms a manual control when the operator is adjacent the column for controlling the feed rate or for preselecting a spindle speed.

The spindle speed control mechanism

The sleeve 103 is provided with a gear portion or ring 104 driving the gear train 105, 106, 107, which later serves to supply power to worm 108 for continuous power actuation thereof. This power is transmitted through gear 109, pinion 110, clutch 111, shaft 112, worm gears 95 and 96 to the rotatable member 113 of the selector control valve 114. The selector control valve 114 is composed of the valve member 113 journaled in the frame of the machine and the sleeves 115, 120, the inner one being shrunk into the outer one. The sleeves which are in effect integral are mounted on the member 113 but held against rotation therewith by the set screw 120[1]. A series of annular grooves 116 are spaced longitudinally on the periphery of the member 115 and each groove has one or more radial bores or ports 116[1] connecting with the inside of the sleeve. The member 113 has a longitudinal central bore 118 for receiving the fluid pressure and has a series of radial bores or inlet ports 117 extending to its periphery, there being one radial bore in the plane of each annular groove in the sleeve 115. The circumferential position of these radial bores with respect to each other is clearly shown in Figures 27-34 inclusive.

The member 113 is also provided with another longitudinal bore 320 which is connected with a return pipe 321 to the reservoir. There is provided a series of radial bores or outlet ports extending from the bore 320 to the periphery of the member 113 as shown in Figures 27-34 inclusive. The outside sleeve 120 has tapped into it a series of pipes 121 to 128 inclusive as shown in Figure 25, each pipe registering with an annular groove 116 in the sleeve 115. It is now evident that when a channel 117 in the member 113 registers with a port 116¹ in the sleeve 115, fluid under pressure will immediatey flow from the bore 118 to the respective annular groove 116 and thence to the pipe connected to that groove. It is also apparent that when an outlet port 322 registers with a port 116¹ in the sleeve 115 returning fluid from a pipe will have free access to the reservoir through the annular groove with which the pipe connects, port 116¹; outlet port 322, bore 320 and pipe 321. Thus any pipe 121 to 128 inclusive and its respective cylinder may be connected to either a source of fluid pressure or to an exhaust.

Referring to Figure 25 it will be seen that the pipes 121 and 128 are connected with cylinders 129 and 130 respectively for movement of the gear couplet 131, 132 through the shifter arm 133.

The pipes 122 and 127 are connected with cylinders 134, 135 respectively for movement of the gear couplet 136, 137 through the shifter arm 138. Similarly pipes 123 and 126 are connected to cylinders 139, 140 for movement of the gear couplet 141, 142 through the shifter arm 143 and pipes 124—125 are connected to cylinders 144—145 for movement of the gear couplet 146—147 through shifter arm 148. These shiftable gear couplets are the means whereby 16 speeds may be obtained in the spindle transmission which will now be described.

The gear couplet 146—147 and 141—142 are slidably mounted upon shaft 149 which is driven by a motor 150 mounted in the base of the machine. The motor drives the sprocket 151 through the flexible chain 152, the sprocket being keyed to the sleeve 103 which may be operatively connected with the shaft 149 through the clutch member 153. The gear couplet 146—147 may be engaged respectively with gears 154 or 155 and gear couplet 141—142 may be engaged respectively with gear 156 or 157 to rotate the shaft 158 at any one of four different speeds.

Slidably mounted on the shaft 159 is the gear couplet 136—137 which may be engaged respectively with gear 156 or 160 to drive the shaft 159 at any one of eight different speeds. Slidably mounted on a shaft 161 which is connected to the shaft 159 through a reverser 162 is a slidable gear couplet 131—132 which may be connected respectively with gears 163 or 164 which are fixedly connected to the cutter spindle 165 whereby the cutter spindle may be driven at any one of sixteen different speeds.

The reverser 162 consists of the gear 166 fixed with the shaft 161 and the slidably mounted gear 167 on the shaft 159 and the pinion 168 keyed to the stud shaft 169. The gear 167 when moved to the right hand position as shown in Figure 6 meshes directly with the gear 166 to drive the shaft 161 in one direction and when moved to its left hand position drives the gear 166 through the pinions 168—168¹ to drive the shaft 161 in a reversed direction.

The slidable gear 167 is manually operated through the handle 171 mounted on the top of the speed box 54.

The description of the details of the gear shifting cylinders whereby they may effect any one of the sixteen speeds of the spindle transmission will now be described. The cylinders 144—145 have slidably mounted therein a piston 172 which has centrally mounted thereon a shifter arm 148 coupled with the slidable gear couplet 146 and 147. On each end of the piston 172 are sleeves 175 which may move longitudinally independently of the piston. These sleeves have an enlarged portion 176 within the cylinders 144 and 145 which forms a shoulder to engage a plate 177 whereby when fluid pressure is admitted to each cylinder the enlarged portion 176 will be forced against plate 177 acting as a stop.

The end of each sleeve will engage the shifter arm 148 to center it and the piston in a neutral position irrespective of their former position. This forms an accurate and positive means for neutralizing the position of the gear couplet 146—147. The cylinders 139—140 have piston 178 slidably mounted therein, the piston having sleeves similar to piston 172 for moving the gear couplet 141—142 to neutral position.

An interlock is provided between the shifter arms 148 and 143, whereby one shifter arm cannot move its gear couplet into driving engagement until the other shifter arm has moved its gear couplet into neutral position. This positively prevents the two gear couplets from being in driving engagement at the same time and thus cause damage to the transmission.

Each shifter arm is provided with a flat surface as shown in Figure 10 on which surfaces are mounted the inter-locking elements. Attached to the flat surface of arm 148 and movable therewith is block 178¹ having a semi-circular cut-out portion as shown in Figure 11. Attached to the arm 143 and movable therewith is the rectangular block 179 and pin 180. Pivoted in a fixed portion of the machine is the semi-circular lock piece 181 having a V shaped groove 182. The operation of this structure is that upon reciprocation of the arm 143 to its neutral position for instance the pin 180 will engage the V shaped groove and rotate the lock member 181 so its flat side will be horizontal as viewed in Figure 11. As soon as the flat surface 183 of the lock member 181 attains a horizontal position it permits the block 178¹ and thereby the arm 148 to move under fluid pressure to shift its gear couplet. As soon as the block 178 moves, one of its flat surfaces 184 will engage the flat surface 183 of the lock member and thus prevent rotation thereof and thereby retain the block 179 and its arm 143 in neutral position. It is thus seen that when the surface 183 and 184 are parallel with one another and the blocks 178¹ and 179 are in vertical alignment both shifter means are in neutral position and either one may be moved but the movement of one will immediately prevent the movement of the other. It is also true that when one shifter arm has been moved so that its gear couplet is in driving engagement, that the other shifter arm and its gear couplet cannot be moved into driving engagement until the first shifter arm has returned its gear couplet to neutral position.

It will be noted from the above that the shifter arms are moved to neutral position only when pressure is admitted to each cylinder of the one piston but when pressure is admitted to one cylinder at one end of the piston and the other cylinder is connected to the return, the difference in pressure between the cylinder will cause the piston to move and carrying with it its shifter arm. The shifter arm will in turn move the sleeve that is in the cylinder connected to the return and this makes it possible to move the attached gear couplet from neutral position to driving engagement. The spring pressed balls 340 acting in detents 341 hold the arms in their various positions.

The construction of the other gear shifting cylinders is somewhat simpler. The cylinders 134—135 for instance have slidably mounted therein the piston 185 carrying the shifter arm 138 fixedly attached thereto. Upon the admission of pressure to either cylinder 134 or 135 the piston 185 is reciprocated to move either gear 136 or gear 137 into driving engagement and it will be noted has no neutral position.

Figure 21:
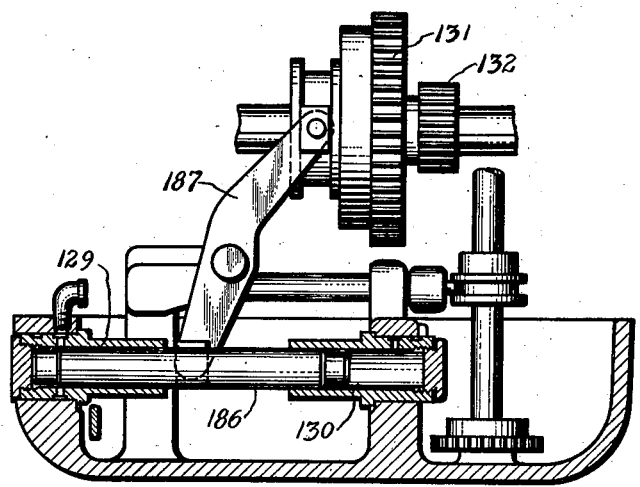
Figure 21 is a detail view of the cylinder for shifting the back gear.

The cylinders 129 and 130 as shown in Figure 21 are of similar construction having the piston 186 which moves, through the crank arm 187 the gear couplet 131—132 and which has no neutral position.

The selector control valve may be rotated to any one of sixteen positions to select any one of the sixteen speeds of the spindle transmission. We have preferably shown an arrangement for obtaining this number of speeds but of course it will be understood that any other number of speeds may be obtained by a slight modification of this system. In order to insure that the rotatable element 113 of the selector valve will index itself properly to a given position there is provided a star wheel 188 on the end of the member 113 as shown in Figure 9. An index pawl 190 is mounted on one end of the shaft 189 and has fixed therewith an arm 191 the arm being provided with a spring 192 having one end attached to a fixed portion of the machine. The spring, through arm 191 holds the index pawl engaged with the star wheel and thus insures through engagement with the notches thereof, the accurate positioning of the same.

In order that the operator may know to what position the selector control valve is indexed to there is provided an indicator 193 mounted on the exterior of the speed change box and rotated through gears 194 and 195 by the shaft 112 which also rotates the member 113. It is thus seen that any movement of the member 113 is simultaneously recorded on the indicator.

The operation of the selector control valve and its function in the system is as follows:

The operator, upon proper manipulation of the handle 62 engages clutch member 111 whereby the member 113 and indicator 192 rotate until the speed at which it is desired to rotate the cutter spindle is indicated by the indicator. The indicator dial has the various speeds marked on its beveled face and there is provided a pointer or index line 192¹ on the speed box cover as shown in Figure 1. When the desired speed is thus indicated, the operator promptly disengages the clutch 111 and the spring pressed pawl 190 comes into operation to accurately index the member 113. The selector valve is now in such a position that upon the subsequent admission of fluid pressure into the system the proper pistons will be actuated to shift their respective gears to effect in the cutter spindle the speed desired by the operator.

The admission of pressure to the selector control valve is governed by a valve mounted in the starting lever which will now be described.

Referring to Figures 17 and 25 there is mounted in the upper part of the column a bushing 196 in which is journaled a valve 197 having fixed thereto at one end jaws 198—199 between which is pivotally mounted starting lever 200. At the other end of the member 197 is pinned the crank arm 201 which actuates through the lever 202 and the bell crank 203, a clutch 153 which operatively connects the prime mover with the spindle transmission.

It is thus seen that rotation of the lever 203 about the axis on the member 197 will start or stop the spindle transmission.

Projecting from the bushing 196 is a stop pin 203 having one side cut away forming a flat as shown in Figure 18. This permits the lever 200 to be rotated on its pivotal mounting 204 to reciprocate plunger 205 which controls the admission of fluid pressure from the accumulator 119 to the selector valve 114. The purpose of the pin 203 is to allow the starting lever 200 to be rotated about its pivot 204 only when it is in the position as shown in Figure 18. When the starting lever is rotated about its other axis that is, the axis of the member 197, the end 206 will engage the top of the pin 203 thus preventing movement about the pivot 204 and insuring that fluid pressure will only be admitted to the gear shifting mechanism when the driving clutch 153 is disengaged. Plunger 205 is provided with an annular groove 207 by means of which when in the position shown in Figure 17 fluid pressure coming through pipe 208 and port 209 is admitted through port 210 and pipe 211 to the selector valve.

A radial channel 212 is drilled in the annular groove and connects with a central bore 213. This bore is adapted to be closed by a ball which is mounted in an enlarged portion of the bore and retained therein by a threaded plug 214. The threaded plug has a small drilled hole longitudinally through the center of it thus allowing the leakage of the fluid pressure into the chamber 215. The fluid which gains admittance to the chamber 215 may gradually flow back to the reservoir through the small opening 216 provided in the member 197. Fluid pressure may also be admitted to the chamber 217 by means of port 218 and the channel 219 which also connects with the port 209. Plunger 205, in its normal position is at the left in Figure 17 and bearing against the end of plunger pin 220. In this position port 209 is closed thus preventing flow of fluid to the selector control valve and allowing the admittance of fluid pressure to the chamber 217 tending to hold the plunger 205 in this position. Upon movement of the lever 200 about its pivot 204 the plunger pin 220 will move longitudinally to the right thus forcing the plunger 205 to the right to the position as it is shown in Figure 17. The moment that the port 209 is uncovered fluid pressure will rush into the chamber 215 and assist the movement of the plunger 205 to the right. This operation effects the desired gear shift in the spindle transmission and it will be noted, while the driving clutch 153 is in a disengaged position. The handle 200 is now returned to the vertical position as shown in Figure 17 and rotation about the axis of the member 197 will engage the driving clutch 153.

Simultaneously with this movement of engaging the clutch the plunger 205 will be returned to its normal position. This is effected by providing the arm 201 with a projection 221 which engages a cam surface 222 of the pivotally mounted lever 223. The plunger 205 has pinned thereto a collar 224 against which lever 223 bears. The operation is such that the projection 221 forces the lever 223 to the left as shown in Figure 17 and by means of the collar 224 returns the plunger 205 to its normal position. As the plunger 205 moves toward the left, it will close the port 209 and uncover the port 218 thus allowing the admission of fluid to the chamber 217 which will assist the returning movement. Fluid will now become entrapped in the chamber 215 which will force the ball against its seat and due to the smallness of the opening 216 will retard movement of the plunger 205. This results in a very important effect in that the clutch 153 will be engaged slowly thus causing the gears of the transmission to be slowly rotated at first. This gives a chance for any gears that are to be shifted to properly mesh before full power is applied thereto. It acts as a check against careless operators who might apply the full power to the transmission before the gears have become properly intermeshed. The accumulator which supplies the fluid pressure to the starting valve will now be described.

Referring to Figure 24 there is mounted on the inside of the column, the accumulator 119 having the pump 225 mounted on the top thereof.

A reservoir 226 is provided in the base of the machine from which the pump forces fluid, preferably oil, into the accumulator 119 through pipe 227. The accumulator valve is composed of the fixed bushing 228 having three longitudinal channels 229, 230 and 231 cut in the periphery thereof. The interior bore of the bushing is divided into an upper and lower chamber by a plug 230' pinned in the central part thereof. In the lower chamber is the slidable valve member 232 which is held by gravity in the lower part of the chamber. In the upper chamber is a slidable valve member 235 having annular grooves 236, 237 and 238. This valve has a shoulder 239 which is held against a seat by a spring 240. The fluid flows into the accumulator through pipe 227, passes through channel 241 lifting the ball 242 which is held against its seat by gravity and flows into the pressure chamber 242¹ of the accumulator, through a pipe not shown.

As the pressure in the pressure chamber rises, fluid will flow from the chamber through ports 243, annular groove 237, port 244, groove 230 into the space above the valve 232 thus holding the valve down to its lowermost position. Fluid will also flow through the groove 231, port 245 into the upper chamber of the bushing 228 and beneath the valve 235 tending to lift the same against the pressure of the spring 240. As the pressure increases the valve 235 will lift closing off port 244 to the supply of fluid pressure and bringing the annular groove 236 opposite the port 244 thus allowing the oil in the chamber 246 to vent to the atmosphere through the longitudinal bore 247 in the valve member 235. This movement also connects the port 248 with the fluid supply through the annular groove 237 which fluid by means of the groove 229 passes beneath valve 232 lifting the same.

When the pressure of the fluid in the pressure chamber has reached a predetermined maximum, the valve 232 will be lifted to such a position that the port 325 which has direct connection to pipe 227 through the channels shown in Figure 23, will be connected to the pipe 326 which leads to the lubricating system. The back pressure in the lubricating system being relatively small, that is, about atmospheric pressure as compared to the high pressure in the pressure chamber that the moment the port 325 is connected with the pipe 326, the pressure in the channels 327 immediately drops causing the ball 242 to seat and hold the pressure in the pressure chamber, while the pump forces fluid into the low pressure lubricating system. It is thus seen that the accumulator stores fluid under high pressure for use in the gear shifting mechanism and when the pressure is at a predetermined maximum causes fluid to be supplied to a low pressure system.

It is of course apparent that as soon as the pressure in the pressure chamber drops below the predetermined maximum that the slidable valve 235 will drop under the pressure of the spring causing a reverse operation of the parts. The valve member 232 will drop thus building up pressure in the channel 327 and causing the pump to force fluid again into the pressure chamber past the ball 242.

The pump is driven directly from the motor 150, through the gear 107, Figure 12 and thus is continuously driven as long as power is applied to the machine. The gear 107 is keyed to its shaft which drives the pump 225 through the Oldham coupling 328. This allows for any inaccuracy in the positioning of the pump.

*The feed transmission*

The feed transmission is particularly illustrated in Figures 12 and 13 of the drawings. It includes a rapid traverse transmission operable at a fixed rate and a sliding gear transmission variably adjustable to obtain at will any one of sixteen selected feeding rates. The primary shaft of this transmission is shaft 249 which is driven by pinion 250 on sleeve 251 which bears worm 252 driven by gear 107 and associate gear train from the gear member 104 actuated directly coupled with the main drive sprocket 151 of the machine as particularly illustrated in Figure 6. Shaft 249 is splined to slidably receive the gear couplet 253—254 and the second couplet, 255—256. Disposed adjacent shaft 249 is a second shaft 257 having keyed thereto a gear member 258 for actuation by gear 256. A second gear unit 259 has a portion 260 for alternative engagement by gear 255 of shaft 249 and a portion 261 engageable by gear 262 of sliding unit 263 having a second portion 264 alternatively engageable with pinion 265 of the couplet 266 keyed to shaft 257 and having the large gear 267 for engagement with gear 253 of shaft 249. It will thus be seen that by translation of units 253—254 and 255—256 shaft 257 may be actuated at four different speeds and these may be communicated in turn through unit 263 to drive shaft 268 at 8 different selected speeds.

Disposed adjacent shaft 268 is the 4th transmission shaft 269 bearing the sliding couplet 270 comprising a pinion gear 271 for engagement with gear 272 on shaft 268 and the large gear 273 for engagement with pinion 274 on shaft 268 whereby shaft 269 may be variably actuated at 16 different speeds depending on the relative positioning of the several sliding gear units just referred to.

Secured in the column portion of the machine is a bushing 275 having rotatably mounted thereon a clutch member 276 serving as a support for ring gear 277 normally locked thereto as by the ball safety devices 278 capable of slippage under heavy load permitting rotation of the ring gear without corresponding movement of the clutch.

Journaled within the bushing 275 is a shaft 279 having on one end a bevel gear drive pinion 280 and having its opposite end journaled within the sleeve portion 281 of the clutch flange member 282. This shaft has centrally splined thereon the clutch spool 83 provided on one end with clutch teeth 284 for interlocking engagement with the teeth 285 of member 276 and at its opposite end has the internal beveled portion 286 designed to operate the clutch fingers 287.

When shifted to the right as viewed in Figure 12 the member 83 interlocks with member 276 to drive shaft 279 and thus through bevel gear 288 the power shaft 289 for control of saddle table and knee movement at a selected rate of speed. When shifted in the opposite direction or to the left clutch 83 is rendered effective to couple member 290 with the shaft. This member being directly driven through the gear transmission series 291 from gear 292 and that in turn from gear 104 on the main drive sleeve serves to actuate shaft 289 at a much higher or rapid traverse rate of speed for fast power adjustment of the shiftable work supporting members previously referred to.

Feed transmission control

Power means are provided for rapid automatic sequential shifting of the several translatable sliding gear units to vary the final feed rate effective through the feed transmission. The drive for this control mechanism is taken from shaft 249 through gears 293 and 294 to shaft 295 to worm 93 and thus through clutch 91—90 to shaft 89 to bevel pinion 296 and intermeshing bevel pinion 297 of cam unit 298, Figure 13.

The general relationship of the control parts will be best understood by reference to Figure 13. Cam member 298 includes a barrel portion 299 having a cam track 300, a barrel portion 301 having the cam path 302 and having the intermediate gear 303. The barrel 301 is notched as at 304 providing a star wheel portion engaged by roller 305 of a spring pressed plunger 306 which serves as a combined actuator and detent to aid in completing initiated movement of the cam and to lock the cam and several parts associated therewith in proper adjusted position.

Disposed adjacent cam member 298 is a second cam unit 307 having a pinion 308 meshing with gear 303 for actuation thereby. This unit is suitably supported for free rotation and has the barrel portion 309 with cam track 310 and a second barrel 311 having cam track 312.

Cam path 300 has engaged therein a roller on the shifter lever 313 cooperating with the spool portion 314 of the couplet 270 controlling the rate of drive from shaft 268 to 269. The second groove 302 on this main cam unit 298 has engaged therein a roller of the shift lever 315 which is in turn connected with the spool portion of sliding unit 263 for determination of the rate of drive of shaft 268 over shaft 257. This cam therefor controls the gear unit of the upper half of the sliding gear transmission mechanism shown in development in Figure 12.

The cam path 310 correspondingly receives a roller in shift lever 316 controlling the unit 253—254 while path 312 actuates the shift lever 317 for the units 255—256. Thus the several relative shiftings in proper sequence as automatically determined by these cams, the 16 successive progressive feed changes are effected in their proper sequence depending entirely on the period during which clutch 91—90 is effective for power rotation of shaft 89 and thus of the shifting mechanism.

It will be noted that shaft 89 is provided with a gear 318 which drives through intermediate gearing the dial 319 carried on the left hand side of the column and serving to indicate by its rotation the progressive shifting of the gears and the several feed rates as the gears move into mesh. In effecting these movements the operator manually actuates handle 62 or handle 102 depending on whether he is exercising control from the front of the machine or a point adjacent the column. Either of these handles will serve to rock the shifter arm or bell crank 88 moving shaft 89 to couple clutch 90—91 and start rotation of the cam control mechanism. As the dial moves to the selected speed, the handle is released discontinuing the power actuation of unit 298 when the final movement is completed by the action of the detent plunger 306 both as to the completion of the shifting and locking of the parts in the selected shifted position.

Similarly, it will be understood that a rocking of either the control lever 62 or 102 in the opposite direction will cause an actuation of the member 87 and thus an energization of the selector control valve to predetermine the rate of spindle rotation.

Machine operation control

For control of the general operation of the machine, use is made of the lever 200 carried by member 197 journaled in the upper part of the column and coupled by arm 201, link 202 and shifter 203 to the clutch 153. Depression of the lever to the position shown in Figure 1, throws out the clutch 153 and stops the drive of shaft 149 and thus the application of power to the spindle. Reverse shifting causes engagement of the clutch when the parts are held in operative relation as by detent means not shown. As link 202 is shifted by depressing lever 200, pin 330 thereon, Figure 36, engages arm 331 of rock shaft 332 having pinion 333 in engagement with rack 334 on rod 81. This shifts the rod to the left, as viewed in Figure 35, compressing spring 335 and moving shifter 82 and member 83 to disconnect the feed clutch 284—285. These parts are therefore held in inoperative position, preventing power actuation of the feed drive when the spindle is stopped. This, however, in nowise interferes with a further shifting of member 83 in the event that it is desired to employ the continuously running power rapid traverse. When lever 200 is raised from the position shown in Figure 1, to render clutch 153 effective, spring 335 expands, re-engaging the feed clutch. It will be understood that on account of the coupling of member 81 with the hand control 50, for selective engagement of feed or rapid traverse, that this lever is also thrown into neutral position when the lever 200 is depressed. The contact between pin 330 and rock arm 331, however, in nowise interferes with actuation of member 81 through handle 50, for coupling of the quick traverse drive as desired.

In addition, it will be apparent from the construction that the operation of the clutch 153 in nowise affects the drive to the feed speed transmission, the power gear shifting control for the feed speed and the selector control valve for the spindle speed transmissions, these being in constant rotation as long as the prime mover is actuated. This results in having the power shifting mechanism and selector control mechanism always available, whether the cutter and table are moving or not, and also provides for quick and easy intermeshing of the gears of the feed transmission when rate shifts are made by the sliding gears. This adds to the facility and speed of operation of the machine.

'We claim:

1. A machine tool transmission including a prime mover and a final part to be rotated thereby, shiftable gear units for determining the rate of actuation of the final part from the prime mover, a branch transmission actuated by the prime mover, means operated by the said branch transmission for predetermining the units to be shifted and additional means operated by the prime mover for shifting the units.

2. A machine tool transmission including a prime mover and a final member to be rotated thereby, shiftable gear units for determining the rate of actuation of the final part from the prime mover, a branch transmission actuated by the prime mover, means operated by the said branch transmission for predetermining the units to be shifted, a manual lever for controlling the effective actuation of the branch transmission and additional means for shifting the units.

3. A machine tool transmission including a prime mover and a final member to be rotated thereby, shiftable gear units for determining the rate of actuation of the final part from the prime mover, a branch transmission actuated by the prime mover, means operated by the said branch transmission for predetermining the said rate of actuation, means also operated by the branch transmission to indicate the preselected rate, and hydraulic means for shifting the units whereby the predetermined rate of actuation becomes effective.

4. In a control mechanism for shiftable units of a variable speed transmission, said units adapted to be given a definite setting for a given speed, a selector valve rotatable to different stations, each station corresponding to a definite setting of the units, manually controlled power means to initiate movement of said valve and detent means to complete the movement of the valve at a given station.

5. In a control mechanism for pressure shiftable units of a variable speed transmission, said units adapted to be given a definite setting for a given speed, a valve to select the units to be subjected to pressure said valve being rotatable to a plurality of stations, each station corresponding to a definite setting of the units, manually controlled power means for initiating movement of the valve and spring means to complete the movement when the power means has been disconnected.

6. In a control mechanism for a pair of shiftable gear units mounted on a single driving member for transmitting a plurality of speeds to a driven member, each unit having a neutral position and a power transmitting position on each side thereof, actuators adapted to shift the units to any of these positions and means whereby one unit can be shifted to power transmitting position only when the other unit is in neutral position and independent means for operating each actuator.

7. In a milling machine having a rotatable spindle, a prime mover, a variable speed transmission, a clutch for operatively connecting the transmission with the prime mover to rotate the spindle, a control mechanism operative upon the transmission to effect speed changes in the spindle, pressure means for actuating the control mechanism and a control valve for said pressure means, unitary means for operating the clutch and the control valve and means in the control valve for retarding the engagement of the clutch.

8. The combination with a milling machine comprising a column, a work support adjustably mounted on the column, a tool spindle journaled in the column, a prime mover, and a variable speed transmission for coupling the prime mover with the spindle, said transmission including a plurality of shiftable units, of an hydraulically actuated change speed mechanism for shifting said units to effect selective speeds of rotation in the spindle, means for predetermining the units to be shifted, and power means for positioning the predeterminator including a branch transmission actuated by the prime mover.

9. The combination with a machine tool organization including a column, a work support carried thereby for translation relative to the column, a rotatable tool support disposed in cooperative relation to the work support, a prime mover, and a variable speed transmission extending from the prime mover to the rotatable tool support for effective rotation thereof, said transmission including a plurality of shiftable units, of hydraulically actuated means coupled with each unit, a source of pressure, a selector valve for predetermining the units to be shifted, a branch transmission constantly driven from the prime mover, clutch means for coupling the selector valve with the branch transmission for actuation thereby, and a control lever adjacent the side of the table opposite to the column for controlling said clutch means.

10. In combination with a milling machine including a column, a work support translatably supported thereby, a rotatable tool spindle journaled in the column in cooperative relation to the work support, a prime mover, and a variable speed transmission extending from the prime mover to the tool spindle for effecting rotation thereof, of an hydraulically actuated change speed mechanism mounted in the column in cooperative relation to said transmission, means for determining the speed to be effected by the mechanism in the spindle including a selector valve, a branch transmission coupled with the prime mover, control means for coupling the valve with the transmission for power rotation and positioning thereof, an indicator rotatably mounted on the exterior of the column, and means actuated by the branch transmission for effecting rotation of the indicator in synchronism with the valve to indicate the position of the latter.

1. The combination with a machine tool organization including a column, a work support mounted for translation relative to the column, a rotatable tool spindle journaled in the column in cooperative relation to the work support, and a prime mover, of a variable speed transmission extending from the prime mover to the rotatable tool spindle for effecting rotation thereof, a second variable speed transmission coupled with the prime mover for effecting translation of the work support, cam means for determining the effective coupling of one of said transmissions, hydraulically actuated means for determining the effective coupling of the other transmission, a source of pressure, a selector valve for predetermining the effective coupling of the hydraulic actuated means with the pressure, a pair of branch transmissions constantly driven by the prime mover, and a single control lever selectively shiftable to couple one of said branch transmissions with the cam means or the other branch transmission with the selector valve.

12. The combination with a milling machine comprising a column, a work support translatably mounted thereon, a tool spindle journaled in the upper part of the column, and a prime mover, of a variable speed transmission for the spindle including a plurality of shiftable gear units, means including a control lever for coupling the variable speed transmission with the prime mover for rotation of the spindle, a change speed mechanism mounted in the column adjacent said transmission comprising an hydraulically actuated shifter for each shiftable unit of the transmission, a selector valve, individual channels extending from the selector valve to each of said units, a source of pressure, means couplable with the prime mover for power rotating and positioning the selector valve to predetermine the units to be shifted and thereby the speed of the spindle, and a control valve interposed between the source of pressure and selector valve and operable by said control lever for effecting the spindle speed predetermined by the selector valve.

13. The combination with a milling machine having a column, a work support mounted for translation relative to the column, a tool support journaled in the column and disposed in cooperative relation to the work support, and a prime mover, of a variable speed transmission extending from the prime mover to the tool support for effecting rotation thereof, an hydraulically actuated speed change mechanism mounted in the column in cooperative relation to said transmission and having a plurality of pressure operated shifters, a selector valve, individual channels extending from the selector valve to each of said shifters, said shifters being mounted in opposed pairs, said selector valve having a pressure port and an exhaust port, a pump constantly driven by the prime mover, a pressure channel extending from the pump to said pressure port, a control valve interposed in said line, means to power rotate said selector valve to couple certain of said shifters with the pressure port and others with the exhaust port to predetermine the speed of the spindle, and control means mounted on the column and overlying the work support for operating the control valve to finally effect the predetermined speed.

14. The combination with a milling machine having a column, a work support reciprocably mounted on exterior guideways formed on the column, a tool spindle journaled in the column, and a prime mover in the base of the column, of a variable speed transmission including shiftable units for imparting rotation to the spindle, a variable feed transmission for effecting relative movement of the work support with respect to the spindle and constantly driven by the prime mover, clutch means for selectively coupling the variable speed transmission with the prime mover, an hydraulically actuated speed change mechanism mounted in the column in cooperative relation to the variable speed transmission, a source of pressure, a selector valve rotatable to a plurality of stations for predetermining the speed to be effected in the transmission by the mechanism upon the admission of pressure thereto, a branch transmission constantly driven by the prime mover, means to selectively clutch the branch transmission with the selector valve to initiate rotation thereof to a predetermined station, detent means to complete said rotation upon disengagement of the clutch means, and means to control the subsequent admission of pressure to the selector valve.

15. The combination with a milling machine having a column, a tool spindle journaled in the column, a saddle, table and knee mounted on the column for effecting movement of a work piece in a plurality of directions with respect to the spindle, and a prime mover, of a variable speed transmission extending from the prime mover to the spindle for effecting rotation thereof, a variable feed transmission constantly driven by the prime mover for effecting adjustment of the saddle, table and knee, an hydraulically actuated speed change mechanism coupled with the variable speed transmission, a power actuated speed change mechanism coupled with the variable feed transmission, a selector valve, a source of pressure, a branch transmission for selectively actuating the selector valve, a second branch transmission for selectively actuating said power actuated change speed mechanism, a single control lever for selectively coupling either of said branch transmissions with its driven member, separate indicating means coupled with each branch transmission mounted on the exterior of the column for indicating the rate of movement of each support, and detent means for maintaining the parts in their final position upon disconnection of the branch transmissions.

16. The combination with a milling machine comprising a column, a work table supported thereon for translation with respect to the column, a tool spindle journaled in the column in cooperative relation to the translatable table, and a prime mover, of a variable speed transmission extending from the prime mover to the rotatable tool spindle for effecting rotation thereof, said transmission including a plurality of shiftable units, a shifter rod mounted in parallel relation to the axis of each unit and having a shifter fork intermediate thereof engaging the unit, each rod having a piston formed on its opposed ends, cylinders for receiving each piston, a selector valve, individual channels extending from each cylinder to the selector valve, said valve having a pressure port and an exhaust port, a cylindrical valve member, means to couple the valve member with the prime mover for power rotation for selectively connecting said cylinders with the pressure port and others with the exhaust port to predetermine the speed of the spindle, and means to connect the valve with the source of pressure to subsequently effect the predetermined speed in the spindle.

17. The combination with a milling machine comprising a column, a spindle journaled therein, a work support organization mounted on the column for translation in a plurality of directions with respect to said spindle, and a prime mover in the column, of a variable speed transmission for coupling the spindle with the prime mover for effecting rotation thereof, said transmission including a pair of shiftable units mounted on a single driving member for transmitting a plurality of speeds to a driven member, each unit having a neutral position and a power transmitting position on each side thereof, actuators adapted to shift the units to any of these positions, means to prevent the shifting of one unit to a power transmitting position until the other unit is in a neutral position, means carried by the work support organization for predetermining the units to be shifted, and additional means carried by the column for subsequently effecting the energization of the predetermined actuators.

18. The combination with a milling machine comprising a column, a work support translatably mounted on the column, a cutter spindle journaled in the column in cooperative relation to said work support, and a prime mover, of a variable speed transmission extending from the prime mover to the spindle for effecting rotation thereof, said transmission including a plurality of shiftable change speed gears and a reverser gear, hydraulically actuated shifters for moving the change speed gears, a source of pressure, means carried by the work support for predetermining the shifters to be connected with pressure and thereby the subsequent speed of the spindle, means overlying the table to effect the admission of pressure to the selected shifters to effect the predetermined speed, and additional means mounted on the column for shifting said reverse gear to thereby change the direction of rotation of the spindle.

19. The combination with a milling machine comprising a column, a tool spindle journaled in the column, and a prime mover carried thereby, of a variable speed transmission for the spindle, a clutch for connecting the transmission with the prime mover for effecting rotation of the spindle, a control lever, motion transmitting means coupling the control lever to the clutch, a branch transmission coupled with the prime mover for continuous actuation thereby, an hydraulically actuated change speed mechanism mounted in the column in operative relation to the transmission, a source of pressure, a rotatable selector valve for predetermining the shiftings to be effected by the mechanism, a clutch for coupling the selector valve with the branch transmission for power rotation to selective speed predetermining positions, a second control lever, motion transmitting means from said control lever to the branch transmission clutch, and valve means operable by the starting clutch control lever while in disengaged position to effect the admission of pressure to the selector valve and thereby actuation of the speed change mechanism to effect the predetermined speed.

20. A milling machine comprising a column, a tool spindle journaled in the column, a prime mover carried thereby, a variable speed transmission for the spindle, a clutch for connecting the transmission with the prime mover for effecting rotation of the spindle, a control lever, motion transmitting means coupling the control lever to the clutch, a branch transmission coupled with the prime mover for continuous actuation thereby, an hydraulically actuated change speed mechanism mounted in the column in operative relation to the transmission, a source of pressure, a rotatable selector valve for predetermining the shiftings to be effected by the mechanism, a clutch for coupling the selector valve with the branch transmission for power rotation to selective speed determining positions, a second control lever, motion transmitting means from said control lever to the branch transmission clutch, and valve means to effect the admission of pressure to the selector valve and thereby actuation of the speed change mechanism to effect the predetermined speed, said starting clutch control lever being movable in one plane to effect coupling of the starting clutch and in another plane to effect coupling of the valve means with a source of pressure.

21. The combination with a milling machine having a column, a work support adjustably mounted on the column, a spindle journaled in the column in cooperative relation with said work support, a variable speed transmission coupled with the spindle, a prime mover, and a clutch for operatively connecting the transmission with the prime mover to effect rotation of the spindle, of an hydraulically actuated speed change control mechanism mounted in the column in operative relation to the transmission, a source of hydraulic pressure, said mechanism including a selector valve for predetermining the speed to be effected in the transmission, a control valve for determining the admission of pressure to the selector valve and thereby the operation of the mechanism, said control valve including a rotatable and reciprocable valve member, a control lever pivotally mounted on one end of the valve stem, motion transmitting connections between the valve stem and the starting clutch, said control lever being movable in one plane to effect reciprocation of the valve and the admission of pressure to the hydraulic shifting mechanism to effect a predetermined speed in the transmission and movable in a plane at right angles to the first plane to effect rotation of the valve and thereby engagement of the starting clutch, and means to retard said rotation to cause a slow acceleration of the variable speed transmission.

22. The combination with a milling machine having a column, a work support mounted thereon, a tool spindle journaled in the column in cooperative relation to said work support, a prime mover, and a variable speed transmission extending from the prime mover to the tool spindle for effecting rotation thereof, of an hydraulically actuated change speed mechanism mounted in the column adjacent said transmission, a selector valve for predetermining the speed to be effected by the mechanism in the transmission, a branch transmission, means to couple the selector valve with the branch transmission for power rotation through selected positions, a pump, a second branch transmission continuously operated by the prime mover for driving the pump, an accumulator, a reservoir, inlet and outlet channels connected to the pump for forcing fluid under pressure into the accumulator from the reservoir during rotation thereof, a control valve, a pressure line extending from the accumulator to the control valve, channel means connecting the control valve with the selector valve, and means for operating said control valve to cause the admission of pressure to the change speed mechanism and thereby the effecting of a change in the rate of rotation of the spindle, a lubricating system and control means in the accumulator for diverting fluid from the pump to said system while the chamber is under predetermined pressure.

23. In a transmission and control mechanism for a spindle of a milling machine the combination with a prime mover of a variable speed transmission including a reverser, means to couple the transmission with the prime mover for actuating the spindle, hydraulically actuated speed change mechanism associated with the transmission for shifting the change gears thereof, manually actuated means for controlling the admission of hydraulic pressure to the speed change mechanism to change the rate of spindle rotation, and additional means for manually shifting said reverser to change the direction of spindle rotation.

24. A machine tool transmission including a prime mover and a final member to be rotated thereby, shiftable gear units in said transmission for determining the rate of actuation of the final member by the prime mover, a branch transmission actuable by the prime mover, means operated by the branch transmission for preselecting the units to be shifted, a clutch for coupling the branch transmission to the prime mover, a manual control lever for the clutch, and additional power means for subsequently shifting the preselected units to change the speed of the final member.

25. A machine tool transmission including a prime mover and a final member to be rotated thereby, shiftable gear units in the transmission for determining the rate of actuation of the final member by the prime mover, a main clutch for coupling the prime mover with the transmission, a branch transmission, an auxiliary clutch for coupling the branch transmission with the prime mover for actuation thereby, means operated by the branch transmission for predetermining the units to be shifted and thereby the speed of the final member, additional means actuated by the branch transmission for indicating the preselected rate, hydraulically actuated means for subsequently shifting said units, a source of hydraulic pressure, a control valve therefor, a main clutch control lever, and means coupling the lever to said valve for determining the admission of pressure to said hydraulically actuated means after disconnecting said main clutch.

26. In a control mechanism for pressure shiftable units of a variable speed transmission, said units being adapted to be given a definite setting for a given speed, a piston coupled to each unit, a cylinder reciprocably receiving each piston, a valve to preselect the units to be subjected to pressure, individual channels connecting the opposite ends of each cylinder to the valve, said valve being rotatable to a plurality of stations, each station corresponding to a different setting of the units, power means for initiating rotative movement of the valve, resilient means for completing the valve movement to the next station after disconnection of the power means, a source of pressure, and a control valve for coupling the pressure to the preselecting valve to shift the units selected thereby.

27. In a control mechanism for pressure shiftable units of a variable speed transmission, said units being adapted to be given a definite setting for a given speed, a piston coupled to each unit, a cylinder reciprocably receiving each piston, a valve to preselect the units to be subjected to pressure, said valve including a fixed outer member, a plurality of radial ports therein, individual conduits connecting the opposite ends of each cylinder to the respective ports in the outer member, an inner member having a pressure channel and an exhaust channel rotatably mounted in the fixed member, each channel having a plurality of radial branches terminating in ports registerable with the ports in the outer member in predetermined order as the member is rotated, power means for initiating the rotative movement of the valve, resilient means for completing the valve movement to the next station after disconnection of the power means, a source of pressure and a control valve for coupling the pressure to the preselected valve to shift the units selected thereby.

28. A milling machine having a column, a work support adjustably mounted on guideways formed on one face of the column, a cutter spindle journaled in the column in co-operative relation to the work support, a prime mover mounted in the column, a variable speed transmission extending to the spindle, a clutch for coupling the prime mover to the transmission for actuation thereby, a pressure operated rate change mechanism for the transmission, a pressure control valve therefor, a starting lever pivotally mounted on the side of the column, and overlying the work support, motion transmitting means coupling the lever to the clutch, and additional motion transmitting means coupling the lever to the valve whereby operation of the spindle starting clutch and the application of pressure to the rate change mechanism may be controlled from either side of the work support.

29. A milling machine having a column, a work support adjustably mounted on guideways formed on one face of the column, a cutter spindle journaled in the column in co-operative relation to the work support, a prime mover mounted in the column, a variable speed transmission extending to the spindle, a clutch for coupling the prime mover to the transmission for actuation thereby, a pressure operated rate change mechanism for the transmission, a pressure control valve therefor, a starting lever pivotally mounted on the side of the column, and overlying the work support, motion transmitting means coupling the lever to the clutch for actuation thereof upon movement of the lever in one direction and additional motion transmitting means connecting the lever to the valve for actuation upon movement of the lever in another direction whereby the operator may selectively control the operation of the starting clutch and the application of pressure to the gear shifting mechanism from either side of the work support.

30. A transmission and control mechanism for a rotatable spindle of a milling machine comprising a pair of shiftable gear units mounted on a driving shaft for transmitting a plurality of speeds to a secondary shaft, each unit thereof having a neutral position and a power transmitting position on either side thereof, an intermediate shaft, a shiftable gear unit for coupling the intermediate shaft to the secondary shaft in different ratios, a final shaft driven by the intermediate shaft, a shiftable gear couplet for coupling the final shaft to the spindle in different ratios, a pressure actuated member connected to each shiftable unit, and means for selectively coupling the members with pressure to shift one or both of the last named gear units simultaneously with the shifting of one of said pair of units to a neutral position and subsequently shifting the other one of said pair of units from a neutral position to a power transmitting position.

31. A transmission and control mechanism for a spindle of a milling machine consisting of a pair of shiftable gear units mounted on a driving shaft transmitting a plurality of speeds to a secondary shaft, each unit thereof having a neutral position and a power transmitting position on either side thereof, an intermediate shaft, a shiftable gear couplet for coupling the intermediate shaft to the secondary shaft in different ratios, a pressure actuated member connected to each shiftable unit and means for selectively coupling the members with pressure to shift the last named gear units simultaneously with the shifting of one of said pair of units to a neutral position and subsequently shifting the other of said pair of units from a neutral position to a power transmitting position.

32. A transmission and control mechanism for a spindle of a milling machine comprising a pair of shiftable gear units mounted on a driving shaft for transmitting a plurality of speeds to a secondary shaft, each unit thereof having a neutral position and a power transmitting position on either side thereof, an intermediate shaft, a shiftable gear couplet coupling the intermediate shaft to the secondary shaft in different ratios, a final shaft driven by the intermediate shaft, a shiftable gear couplet for coupling the final shaft to the spindle in different ratios, a pressure actuated member connected to each shiftable unit and means for selectively coupling the members with pressure and shifting both of said last named units in the same or opposite directions simultaneously with the shifting of one of said pair of units to a neutral position and subsequently shifting the other of said pair of units from a neutral to a power transmitting position.

33. In a milling machine, the combination of a base, a tool spindle rotatably supported from said base, a work table supported from said base for movement in a direction transverse to the spindle axis, a power source driven at a substantially constant rate, a feed train driven from said source for relative bodily movement of said spindle and table, a spindle rotating train driven from said source, clutch means operable for interrupting both said trains, said spindle train including a rate changer having a plurality of gear elements shiftable into various position combinations collectively giving rise to a fast speed, a relatively slow speed and a plurality of intermediate speeds of said spindle; and control mechanism for said spindle train including a shifter operable to move said shiftable elements into said various position combinations one at a time, a train driven from said power source exclusive of said main clutch and connectible to operate said shifter, a lever manually operable to control the connection of the last mentioned train with said shifter, and speed selective means associated with said shifter including a chart having numerical markings respectively corresponding to different of said spindle speeds and an indicator movable relative to said chart in accordance with the element positioning effect resulting from operation of said shifting means.

34. In a milling machine, the combination of a base, a tool spindle rotatably supported from said base, a work table supported from said base for movement in a path transverse to the axis of said spindle, a transmission for said machine including a power source, a train driven from said source to move said table, a train driven from said source to rotate said spindle, said transmission providing a motion interrupter effective on both said trains and a rate changer effective on one of said trains and having a plurality of gear elements shiftable into a series of position combinations productive of a corresponding series of different rates, and control means for said rate changer including a selector adapted to preselect a desired one of said position combinations, a shifter operable to move said elements from any of said position combinations to the position selected by said selector, a power train driven from said source exclusive of said motion interrupter and connectible to operate said shifter, a single manually operable lever having different movements respectively for movement of said selector and for controlling the connection of the last mentioned train with said shifter, and means visibly indicating the result of the operation of said control means.

35. In a milling machine, the combination of a rotatably movable tool support, a support bodily movable adjacent said tool support in a direction transverse to the axis thereof, a transmission for one of said movements driven at a substantially constant rate and including an element operable to effect a variety of rates including a fast rate, a relatively slow rate, and a plurality of intermediate rates, said transmission including a rate changer adjustable into a variety of different positions collectively productive of all of said rates and respectively determinative of different of said rates; and control mechanism for said transmission including a shifter operable to adjust said rate changer out of any of said positions of rate changer adjustment into any other thereof, a selector movable to various positions respectively determinative upon operation of said shifter of different of said positions of rate changer adjustment and movable independently of the position of adjustment of said rate changer and in advance of said operation of said shifter, said shifter being subsequently separately operable to effect the rate predetermined by said selector, a chart having markings respectively representing different of said rates, and indicating means movable relative to said chart in accordance with movement of said selector, whereby to visibly indicate upon said chart the result which will be effected upon operation of said shifter.

36. In a milling machine, the combination of a rotatably movable tool support, a support bodily movable adjacent said tool support in a direction transverse to the axis thereof, a power source, a transmission for one of said movements driven at a substantially constant rate and including an element operable to effect a variety of rates including a high rate, a relatively low rate, and a plurality of intermediate rates, said transmission including a rate changer driven from said power source and adjustable into a variety of positions collectively determinative of all of said rates and respectively determinative of different of said rates; and control mechanism for said transmission including a shifter operable to adjust said rate changer out of any of said positions of adjustment thereof into any other of said positions, a selector movable separately with respect to said shifter and in advance of operation of said shifter to various positions respectively determinative of different of said positions of rate changer adjustment, a power train driven to exclude said rate changer and connectible to operate said shifter, a hand lever operable for said connection of said power train, a chart having markings respectively representing different of said rates, and indicating means movable relative to said chart in accordance with the movement of said selector, whereby to visibly indicate on said chart the result which will be effected upon operation of said hand lever.

37. In a milling machine, the combination of a rotatably movable tool support, a support bodily movable adjacent said tool support in a direction transverse to the axis thereof, a power source, a transmission for one of said movements driven at a substantially constant rate and including an element operable to effect a variety of rates including a high rate, a relatively low rate, and a plurality of intermediate rates, said transmission including a rate changer driven from said power source and adjustable into a variety of positions respectively determinative of different of said rates; and control mechanism for said transmission including a shifter operable to adjust said rate changer into any of said positions of adjustment thereof one at a time, a selector movable separately with respect to said shifter and in advance of operation of said shifter to various positions respectively determinative upon subsequent operation of said shifter of different of said positions of rate changer adjustment, a power train driven from said transmission to exclude said rate changer and connectible for operation of said shifter, a hand lever operable to effect said connection of said power train, a chart having markings respectively representing different of said rates, and indicating means movable relative to said chart in accordance with the movement of said selector, whereby to visibly indicate on said chart the result which will be effected upon operation of said hand lever.

38. In combination with the transmission for the spindle of a machine tool, including a casing, a hydraulically operated shifting device connected to each respective set of shiftable gears of the transmission, means for developing fluid pressure within the casing, a main control valve for controlling the application of the fluid pressure, a selector valve having fluid connection to said main control valve for controlling the application of the fluid pressure to a particular shifting device, conduits connecting the fluid pressure from the selector valve to the respective devices, and a control lever for co-incidentally controlling the drive shaft transmission and the application of the fluid pressure through the control valve.

39. In a system of the class described, a transmission casing, a spindle mounted in the casing, a train of gears extending to the spindle, a main power shaft for driving said gears, clutch means for connecting said main power shaft to the transmission, shifting devices located throughout the transmission casing, one adjacent each set of shiftable gears of the train, a fluid pressure device located within the casing and having transmission connection to the main power shaft, a supply conduit extending from the fluid pressure device to the respective shifting devices, a control valve located in said conduit and operated coincidentally with the operation of the clutch means for connecting the power shaft to the transmission, and a selector valve located beyond the control valve for controlling the application of the fluid pressure to a particular shifting device.

40. A hydraulic gear shifting apparatus comprising a driven member, a clutch controlled speed change transmission for said driven member, a clutch operating lever, a fluid pressure developing means, a main supply control valve actuated by the clutch lever of the transmission, a selector valve having fluid connection to said control valve, a plurality of shifting devices associated with the respective shifting speed changing elements of the transmission, said devices having fluid connections to said selector valve, and means for setting said selector valve for controlling the fluid supply and exhaust to said devices for appropriate speed changes.

41. A machine tool comprising a driving element, a spindle, a train of driving members interposed between said driving element and said spindle to drive said spindle, a plurality of shiftable speed changing members included in said train of driving members and separately operable when said spindle is disconnected from said driving element to change the relative speed of said driving element and spindle, power actuated members operable while said spindle is disconnected from said driving element adapted to separately actuate said shiftable speed changing members, a power directing member operable while said spindle is connected to said driving element adapted to be adjusted to different positions with reference to said power actuated members and said shiftable speed changing members, and a power releasing member operable only when said spindle is disconnected from said driving element.

42. A machine tool comprising a driving element, a spindle, a train of driving members interposed between said driving element and said spindle, a plurality of shiftable speed changing members included in said train of driving members and separately operable while said spindle is disconnected from said driving element, manually operable means to primarily select the desired positions of said shiftable speed changing members operable while said spindle is connected to said driving element, and manually operable means operable while said spindle is disconnected from said driving element to actuate said shiftable speed changing members in the order primarily selected from one position to the next.

43. A machine tool comprising a driving element, a shaft to which said driving element is selectively connected and disconnected, a spindle, a train of driving members interposed between said driving element and said spindle to drive said spindle, a plurality of shiftable speed changing members included in said train of driving members and separately operable when said spindle is disconnected from said driving element, manually operable means to predetermine the next selected position of said shiftable speed changing members operable while said spindle is connected to said driving element, and power operated means operable when said spindle is disconnected from said driving element to shift said shiftable members from one position to the next.

44. A machine tool comprising a driving element, a shaft to which said driving element is selectively connected and disconnected, a spindle, a plurality of speed changing gear trains intermediate of said shaft and said spindle, manually operable means for setting a selected number of said speed changing gear trains while in driving connection with said driving element and said spindle, and a power operated means to complete the shifting of said selected speed changing gear trains while said driving element is out of driving relation with said shaft and driving element.

45. A hydraulic gear shifting apparatus for a machine tool, comprising a spindle, a clutch controlled transmission for said spindle, a clutch operating lever, a fluid pressure developing means, a main supply control valve actuated by the clutch lever of the transmission, a selector valve having fluid connection to said control valve, a plurality of shifting devices associated with the respective shifting speed changing elements of the transmission, said devices having fluid connections to said selector valve, and means for setting said selector valve for controlling the fluid supply and exhaust to said devices for appropriate speed changes.

46. The combination with a milling machine including a spindle supporting casing and work supporting means movable with respect thereto; a hydraulic apparatus for shifting gears within the spindle supporting casing comprising fluid pressure means within the casing, a selector valve, a fluid connection from said pressure means to said selector valve, fluid actuated devices for the respective gears connected to and controlled by the selector valve for appropriately shifting the gears and a dual control for operating the selector valve including a manipulating means on the casing and a manipulating means on the movable work support, the latter manipulating means being flexibly connected to the casing.

47. In a milling machine, the combination of a base, a tool spindle rotatably supported from said base, a work table supported from said base for movement in a direction transverse to the axis of said spindle, a transmission for said milling machine including a substantially constant speed power source, a train driven from said source for rotation of said spindle, said transmission providing motion interrupting means effective on both said trains and a rate changer effective on one of said trains and having a plurality of gear elements shiftable into a series of position combinations productive of a corresponding series of different rates; and control means for said transmission including a selector movable to preselect a desired one of said position combinations, a shifter adapted to move said elements from any of said position combinations to the position combination selected by said selector, a train driven from said source exclusive of said motion interrupter and connectible to operate said shifter, and means visibly indicating the result of the operation of said control means.

48. In a milling machine, the combination of a base, a tool spindle rotatably supported from said base, a work table supported from said base for movement in a direction transverse to the axis of said spindle, transmission means for said support including a substantially constant speed power source, a train driven from said source for movement of said table, and a train driven from said source for rotation of said spindle, said transmission providing a rate changer effective on one of said trains and having a plurality of gear elements shiftable to a series of position combinations productive of a corresponding series of rates, and control means for said transmission including a shifter providing a plurality of independently movable fluid operable devices for shifting said gear elements, channels respectively connected with different of said devices, adjustable valve means associated with channels for controlling supply of fluid thereto and having a plurality of positions respectively adapted to supply fluid to different combinations of said channels corresponding to said position combinations of said elements, a power operated pump for the supply of fluid to said channels through said valve means, and means visibly indicating the result of the operation of said control means.

49. In a milling machine, the combination of a base, a tool spindle rotatably supported therefrom, a work table supported from said base for movement in a direction transverse to the axis of said spindle, a transmission for said machine including a substantially constant speed power source, a train driven from said source to move said table and a train driven from said source to rotate said spindle, said transmission including clutch means operable for interruption of said trains and a rate changer effective on said spindle train and having a plurality of gear elements shiftable into a series of position combinations productive of a corresponding series of rates, and control means for said spindle train including a shifter providing a plurality of independently movable fluid operable devices for shifting said gear elements, fluid channels respectively connected with different of said devices, a pump driven from said transmission exclusive of said clutch, valve means associated with said channels and adapted to simultaneously supply fluid from said pump to different of said devices, said valve means having a plurality of positions respectively for the supply of fluid to different combinations of said channels, a chart having markings representing different speeds and an indicator relatively movable with respect to said chart in accordance with the result of operation of said control means.

50. In a milling machine, the combination of a base, a spindle rotatably supported from said base, a support supported from said base for bodily movement relative to said spindle in a direction transverse to the axis thereof, transmission means for said machine including a power source, a train driven from said source for movement of said support and a train driven from said source and adapted to rotate said spindle, one of said trains providing a rate changer having a plurality of gear elements shiftable into a series of position combinations resulting in a corresponding series of different rates; and control mechanism for said transmission including a shifter adapted to be fluid operated for shifting said gear elements out of any of said position combinations and into any other thereof, a power operated pump connectible for operation of said shifter, valve means associated with said pump and shifter and controlling the operation of said shifter for determining which of said position combinations will be affected thereby, and means operable independently of said valve means for controlling the connection of said pump and shifter, and means visibly indicating the result of the operation of said control mechanism.

51. In a milling machine, the combination of a rotatable tool spindle, a work support adjacent said spindle and reciprocably movable in a path transverse to the spindle axis, a substantially constant speed power source, a spindle train driven from said source and including a rate changer providing a number of gear elements shiftable into various position combinations respectively effective for different spindle speeds, a feed train for said work support and including a rate changer adjustable for a variety of relatively slow feed rates of support movement, clutch means operable to simultaneously interrupt both said trains, a first train driven from said power source to exclude said clutch means and each of said rate changers and connectible for a relatively fast rate of support movement, a second train driven from said power source to exclude said clutch means and both said rate changers and control mechanism for said milling machine including a fluid operable gear shifter operable to shift the gear elements of said spindle train rate changer out of any of said position combinations into any other thereof, a pump driven from said second train and connectible to operate said gear shifter, selective valve means associated with said pump and shifter and adjustable to predetermine a position combination which will result from shifter operation and in advance thereof, and other valve means operable independently of the first mentioned valve means for connecting said pump to operate said shifter.

LESTER F. NENNINGER.
HANS ERNST.